(12) United States Patent
Updegraff (10) Patent No.: US 7,471,420 B2
(45) Date of Patent: Dec. 30, 2008

(54) METHOD OF UNIFORMITY CORRECTION IN AN ELECTROSTATOGRAPHIC PRINTER BY USING A SECOND ACTUATOR

(75) Inventor: Shawn P. Updegraff, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 764 days.

(21) Appl. No.: 11/094,406

(22) Filed: Mar. 31, 2005

(65) Prior Publication Data

US 2006/0227391 A1     Oct. 12, 2006

(51) Int. Cl.
*B41J 2/435* (2006.01)
*B41J 2/45* (2006.01)
*B41J 2/47* (2006.01)
*H04N 1/40* (2006.01)
*G06K 15/00* (2006.01)

(52) U.S. Cl. .............. 358/3.06; 347/236; 347/237; 347/238; 347/239; 358/3.02; 358/3.11; 358/3.12; 358/1.18

(58) Field of Classification Search ............. 358/1.9, 358/3.06, 3.02, 3.09, 3.11, 3.12, 1.18; 399/44, 399/46, 49, 53; 347/236–329
See application file for complete search history.

(56) References Cited

U.S. PATENT DOCUMENTS

| | | | |
|---|---|---|---|
| 5,640,190 A * | 6/1997 | Bollansee et al. | 347/240 |
| 5,784,667 A * | 7/1998 | Mestha et al. | 399/49 |
| 6,792,220 B2 * | 9/2004 | Randall et al. | 399/49 |
| 2002/0196437 A1 * | 12/2002 | Tandon et al. | 356/320 |
| 2003/0055611 A1 * | 3/2003 | Mestha et al. | 702/196 |
| 2004/0101320 A1 * | 5/2004 | Haramoto | 399/12 |
| 2004/0136013 A1 * | 7/2004 | Mestha et al. | 358/1.9 |

* cited by examiner

*Primary Examiner*—Mark K Zimmerman
*Assistant Examiner*—Haris Sabah
(74) *Attorney, Agent, or Firm*—Oliff & Berridge, PLC (57) ABSTRACT

Various exemplary embodiments include an electrostatographic printing apparatus and a method of correcting one or more associated uniformity profiles. In various exemplary embodiments the apparatus includes first and second actuators. In various exemplary embodiments the method includes measuring an image and generating at least one corresponding TRC, generating a charge profile, subtracting a reference patch density from a patch value to obtain a difference profile, converting the difference profile to a ROS intensity profile and an LED intensity profile, and iteratively repeating the steps of measuring, generating, subtracting and converting until within an acceptable range.

11 Claims, 6 Drawing Sheets

METHOD OF UNIFORMITY CORRECTION IN AN ELECTROSTATOGRAPHIC PRINTER BY USING A SECOND ACTUATOR

BACKGROUND

This invention relates to a method for improving the accuracy of a printed image more particularly to a method of uniformity correction in an electrostatographic printer that uses an LED bar as a second actuator.

DESCRIPTION OF RELATED ART

A common approach to creating an image in an electrostatographic printer uses a raster output scanner (ROS). In a ROS imager, a laser is swept across a photoreceptor surface. The laser writes the image by creating a digital pattern of pixels that are either on or off.

Over any given image region, a percentage representing a particular halftone density corresponds to the percentage of pixels in that region that are on as a fraction of all of the pixels in the region. For example, a 20% halftone density for a particular image region means that 20% of the pixels in that image region are on and 80% of the pixels in that region are off.

The uniformity of a halftone corresponds to how uniformly that halftone is created over any given image area. For example, if an image area is divided into three sub-areas and one of those sub-areas is at a halftone density of 20%, while another is at a halftone density of 25%, and the third is at a halftone density of 30%, then the halftone uniformity for that entire image area is poor. Conversely, if an image area is divided into several dozen sub-areas or more, and all of those sub-areas have a halftone density of 20% when rounded to the nearest full percent, then that image has a good halftone uniformity. When the sub-areas of an image area do not have the same halftone density, then the halftone density for that image area is said to be non-uniform. The magnitude with which the halftone densities of various sub-areas of an image area are non-uniform is referred to as the non-uniformity of the overall halftone density in that image area.

When an image is reproduced, the accuracy of the reproduction process can be evaluated by testing the accuracy with which uniform halftones are reproduced. The more accurately uniform halftones are reproduced, the more accurate the overall image reproduction is expected to be.

SUMMARY

In one exemplary embodiment, a ROS imager uses a spatially addressable array to modify the output intensity to compensate for poor halftone uniformity. In this exemplary embodiment, a laser power is changed along the scan line to compensate for poor halftone uniformity. This adjustment to the laser power corresponds to an adjustment in the tone reproduction curves (TRC) along the scanline. However, the sources and causes of any given non-uniformity in the halftones do not evidence themselves over a full tone reproduction curve or family of tone reproduction curves in equal amounts or amplitudes.

According to an exemplary nomenclature, halftones having about a 20% density are referred to as highlight tones or the highlight region of tones. Halftones having a density of 50-70% are referred to as midtones. Likewise, halftones having a density of 70-90% are referred to as shadow tones according to this nomenclature.

In various exemplary embodiments, the tone reproduction curve has a steeper slope than the ideal or desired slope. Thus, in these embodiments the halftones tend to be darker than desired.

In various exemplary embodiments, an actuator is used to compensate for the error in halftone uniformity. In various exemplary embodiments, this correction results in an over-compensation in the highlight region and an under compensation in the shadow region while the mid-tone region is fairly accurately compensated. Nevertheless, it is believed that a more improved correction would include an accurate tone reproduction curve in the shadow region and the highlight region as well as the mid-tone region.

In various exemplary embodiments, a second actuator is used to further adjust the corrected tone reproduction curve resulting from embodiments using a single actuator to adjust laser power. In various exemplary embodiments, the second actuator is used to twist the profile of the corrected curve resulting from the adjustment of the single actuator embodiments. Because the tone reproduction curves resulting from an adjustment to laser power by a single actuator typically under correct in the highlight region and over correct in the shadow region, a greater level of consistency with the target tone reproduction curve is achieved in various exemplary embodiments by using the second actuator to twist the profile of that curve.

In various exemplary embodiments using a single actuator, the correction to the tone reproduction curve is the same magnitude at every percentage of digital area coverage. Thus, in various exemplary embodiments using a single actuator, an average correction value is calculated and applied at every percentage of digital area coverage. In other words, in various exemplary embodiments, the magnitude of the shift to the tone reproduction curve using two actuators is not the same at every percentage of digital area coverage.

In various exemplary embodiments, a second actuator is used to obtain a corrected data point, and then the second actuator is applied iteratively to create further corrected data points. Thus, in various exemplary embodiments, the second actuator is applied iteratively and a new differential between the corrected data point and the desired data point is calculated for each iterative step of the process.

In various exemplary embodiments, a desired maximum allowable level of error is predetermined, and a second actuator is applied to the data points iteratively until the entire curve is within the allowable maximum error level.

Thus, in various exemplary embodiments, by achieving a greater approximation of the desired tone reproduction curve, the range of laser power available is increased. Other advantages of various exemplary embodiments are improved compensation for print engine transients that change the halftone uniformity over time as more and more copies are printed, reducing the contamination of charge device grids caused by non-uniformity in the halftone reproduction curves, increasing the life span of developer wires and thus reducing the frequency with which developer wires need to be replaced, and similarly reducing the use of unnecessary excess developer material and correspondingly reducing the frequency with which aged developer material needs to be replaced These and other features and advantages are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EMBODIMENTS

Figure 1:
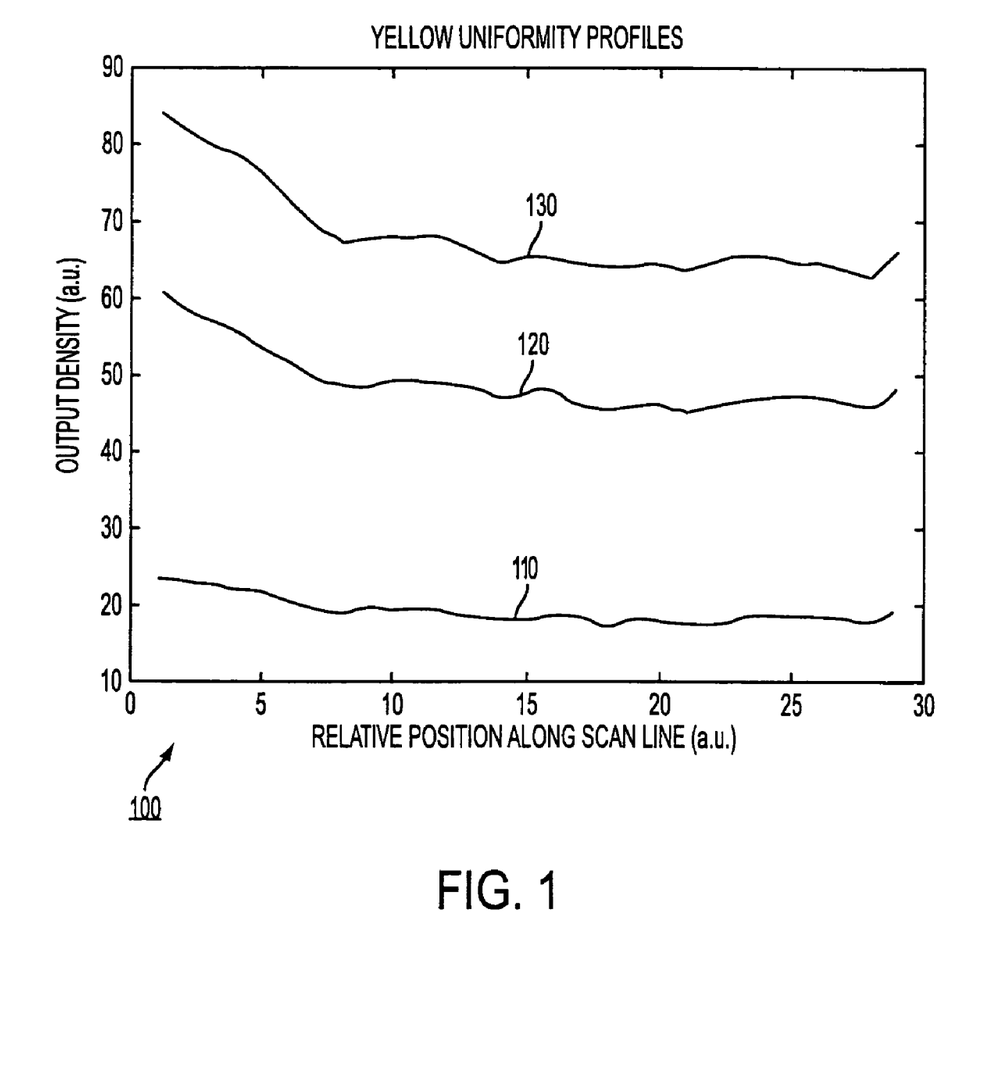
FIG. 1 is a graph depicting curves for three exemplary output densities relative to position along an image scan line.

FIG. 1 includes an exemplary graph 100 showing three exemplary profiles of uniformity differences by area coverage. The X-axis in FIG. 1 corresponds to a relative position along a scan line in arbitrary units (a.u.). The Y-axis in FIG. 1 represents the output density also in arbitrary units. The three exemplary profiles depicted in the graph 100 are yellow uniformity profiles. However, these exemplary profiles are believed to be representative of all print colors.

It is also believed that the exemplary curves in graph 100 would be similar for a Y-axis arbitrary unit representing hue, color, tint or other arbitrary unit substituted for the output density units shown. The curves in graph 100 are obtained by determining a reference point and measuring the variation of data acquired during a scan as compared to that reference point. In various exemplary embodiments, the reference point is an arbitrary white point corresponding to white paper. Thus, in various exemplary embodiments, the variation is represented by $\Delta E$, the difference with respect to the CIELAB standard for color formulation.

Exemplary curve 110, exemplary curve 120 and exemplary curve 130 all use the data point at arbitrary unit 15 along the scan line as the reference data point. The reference data points at arbitrary unit 15 along the scan lines plotted in exemplary curve 110, exemplary curve 120 and exemplary curve 130 do not correspond to the arbitrary white point of paper. In other words, the reference point used to create exemplary curves 110, 120 and 130 is different from each of the reference points used to determine the variance in those curves from their ideal form. An ideally uniform image would result in a curve consisting of a horizontal line that passes through the reference point of each curve. Typically, the data acquired during a scan is not ideal.

The reference point for curve 110 corresponds to an output density of about 20. The reference point for exemplary curve 120 corresponds to an output density of about 50. Likewise, the reference point for exemplary curve 130 corresponds to an output density of a little less than 70. The exemplary curves in graph 100 are not horizontal lines passing through their reference points. Thus, the images measured by the exemplary scans resulting in exemplary curve 110, exemplary curve 120 and exemplary curve 130 are non-uniform.

Figure 2:
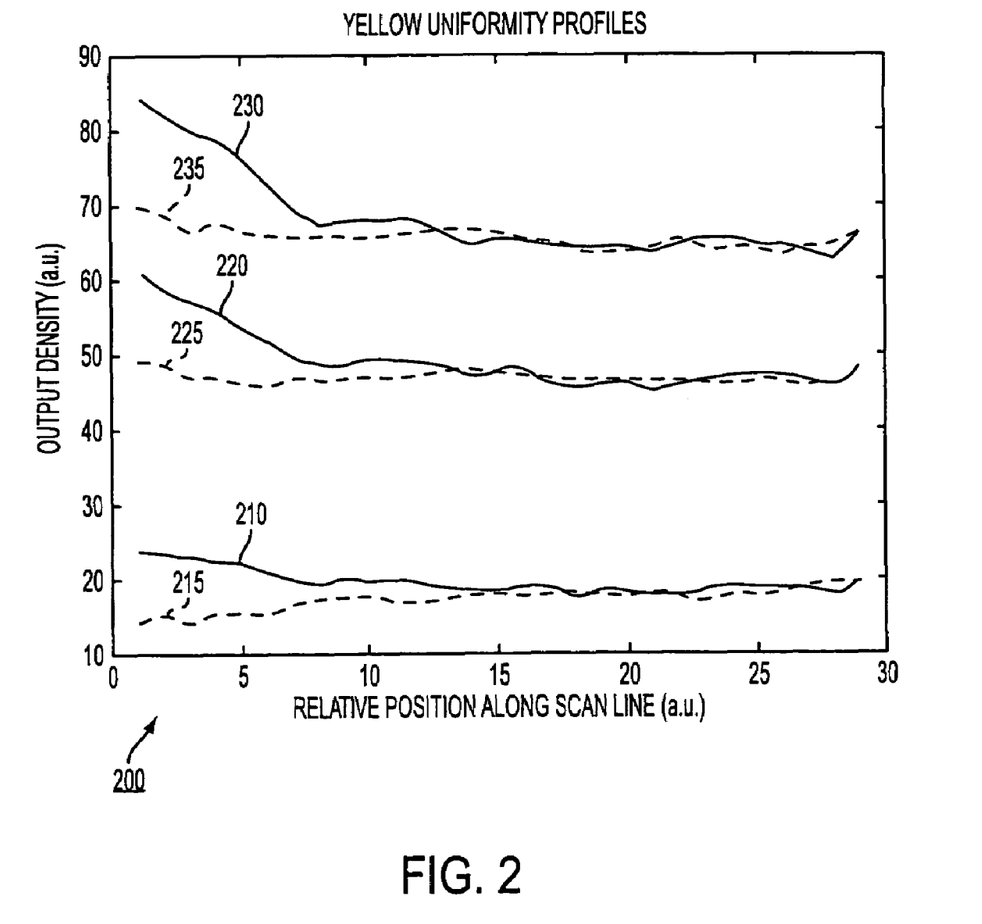
FIG. 2 is a graph corresponding to the graph of FIG. 1, including additional exemplary corrected curves of exemplary embodiments using a single actuator adjusting laser power.

FIG. 2 shows the exemplary curves of FIG. 1 again plotted as solid lines. The reference point for exemplary curve 210 is at arbitrary unit 15 along the scan line, and again corresponds to an output density of about 20. The reference point for exemplary curve 220 is also again taken at arbitrary unit 15 along the scan line, and again corresponds to an output density of about 50. Likewise, the reference point for exemplary curve 230 is also taken at arbitrary unit 15 along the scan line and corresponds to an output density of a little less than 70.

Exemplary corrected curve 215, exemplary corrected curve 225 and exemplary corrected curve 235 are represented in the graph 200 as dashed curves. Exemplary corrected curve 215 is approximately equal to the reference point at arbitrary unit 15 along the scan line. Similarly, exemplary corrected curve 225 is approximately equal to the reference point of exemplary curve 220 at arbitrary unit 15 along the scan line. Likewise, exemplary corrected curve 235 is approximately equal to the reference point of exemplary curve 230 at arbitrary unit 15 along the scan line. However, at the beginning positions along the scan line, the left portions of the curves, exemplary corrected curve 215 is over-corrected and lies well below the reference output density of about 20. Conversely, exemplary corrected curve 235 is undercorrected at the beginning points along the scan line and lies above its reference point.

The correction employed for exemplary curves 215, 225 and 235 in graph 200 consists of an exemplary embodiment of a single actuator used to adjust laser power. The graph 200 shows that any additional correction applied to the exemplary corrected 70% profile 235 would push the exemplary corrected 20% profile 215 further away from the desired reference point by an even greater overcompensation. Similarly, any attempt to move the exemplary corrected 20% profile 215 up towards the reference point of 20 would move the exemplary corrected 70% profile 235 further away from its desired reference point.

In various exemplary embodiments, it is desirable that all of the corrected profiles stay within four arbitrary units of $\Delta E$ on the output density scale. However, in the exemplary corrected embodiments depicted in graph 200, it is not possible for exemplary corrected curve 215, exemplary corrected curve 225 and exemplary corrected curve 235 to all maintain an error rate less than four arbitrary units of output density or $\Delta E$ from the reference points.

For example, exemplary corrected profile 215 varies from a minimum of about 14 arbitrary units of output density to a maximum of about 20 arbitrary units of output density. This corresponds to a variance of $6\Delta E$ which is greater than a variance of $4\Delta E$. Thus, in various exemplary embodiments, an additional correction is employed. In other exemplary embodiments, the maximum allowable variance is greater than $4\Delta E$.

Figure 3:
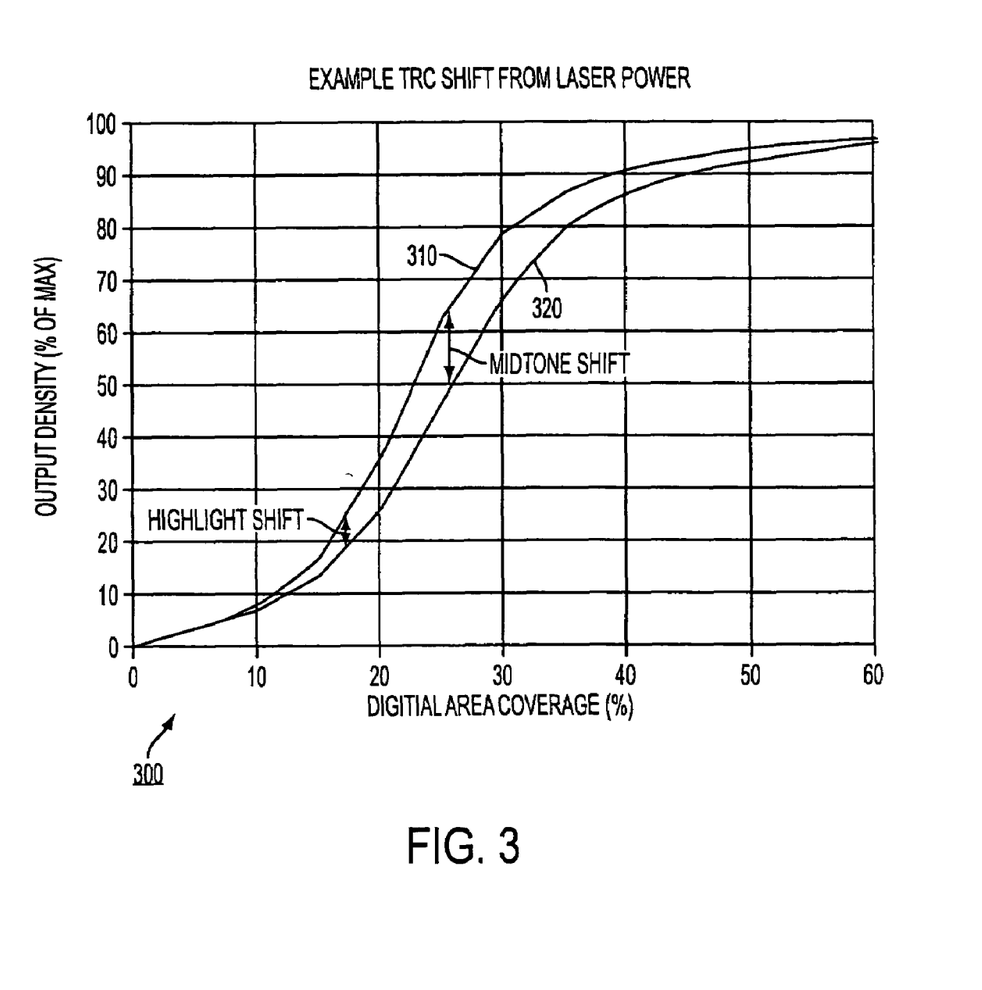
FIG. 3 is a graph showing an exemplary uncorrected tone reproduction curve and the shift occurring in an exemplary corrected embodiment using a single actuator adjusting laser power.

FIG. 3 includes a graph 300 depicting an exemplary uncorrected tone reproduction curve 310 and an exemplary laser power adjusted tone reproduction curve 320. The X-axis in FIG. 3 corresponds to the percent of digital area coverage from 0% to 60%. Thus, the left portions of the curves in graph 300 are plotted in the highlight tone reproduction region and the central portions of the curves plotted in graph 300 occur in the midtone reproduction region and the rightmost extremity of the curves plotted in graph 300 represent the beginning of the shadow tone reproduction region.

The exemplary embodiment plotted by tone reproduction curve 320 employs a single actuator to adjust laser power. As is evident from a comparison of curve 310 and curve 320, the greatest variance between exemplary uncorrected tone reproduction curve 310 and exemplary laser power adjusted tone reproduction curve 320 occurs in the midtone region. This is designated in the graph 300 as midtone shift. The midtone shift in graph 300 is significantly larger in magnitude than the highlight shift designated in graph 300.

Figure 4:
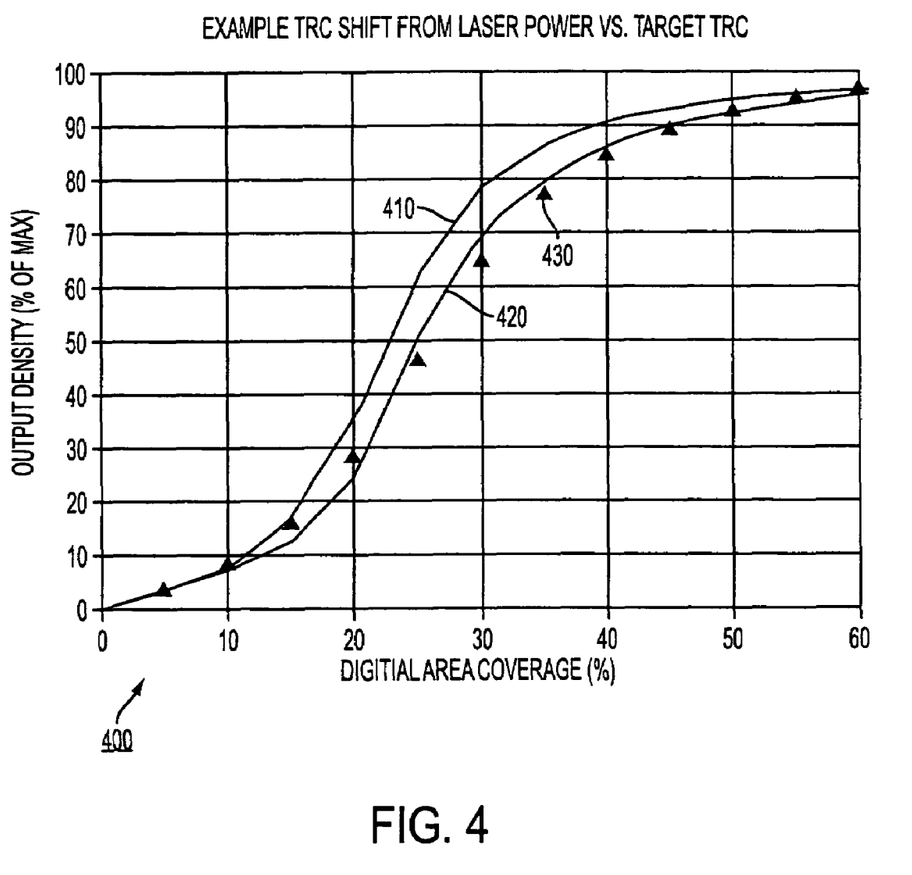
FIG. 4 is a graph showing the exemplary curves of FIG. 3 with a third exemplary curve corresponding to the desired tone reproduction curve superimposed thereupon.

FIG. 4 is a graph 400 that plots an exemplary uncorrected tone reproduction curve 410, an exemplary laser power adjusted tone reproduction curve 420 and an exemplary target tone reproduction curve 430. The target tone reproduction curve 430 is plotted as a series of triangles. The exemplary laser power adjusted tone reproduction curve 420 corresponds to curve 320. The exemplary uncorrected tone reproduction curve 410 corresponds to uncorrected tone reproduction curve 310.

The exemplary laser power adjusted tone reproduction curve 420 lies below target tone reproduction curve 430 in the highlight region. Conversely, exemplary uncorrected tone reproduction curve 420 lies above target tone reproduction curve 430 in the shadow region. Thus, it is evident that the laser power correction employed to obtain laser power adjusted tone reproduction curve 420 overshot the target tone reproduction curve 430 in the highlight region.

However, exemplary laser power adjusted tone reproduction curve 420 and exemplary uncorrected tone reproduction curve 410 are both above the target tone reproduction curve 430 in the midtone region of graph 400. Thus, the laser power correction employed to achieve laser power adjusted tone reproduction curve 420 undershot the target tone reproduction curve 430 in the midtone region while overshooting the target tone reproduction curve 430 in the highlight region of graph 400.

The foregoing description demonstrates that the sources of non-uniformity do not propagate at equal amplitudes over the entire tone reproduction curves. In the exemplary embodiments depicted in graph 400, because the midtone area of coverage manifests the largest non-uniformity, the use of a single actuator to adjust laser power (curve 420) results in an overcompensation in the lighter regions of the tone reproduction curve in order to improve the darker regions of the tone reproduction curve.

Figure 5:
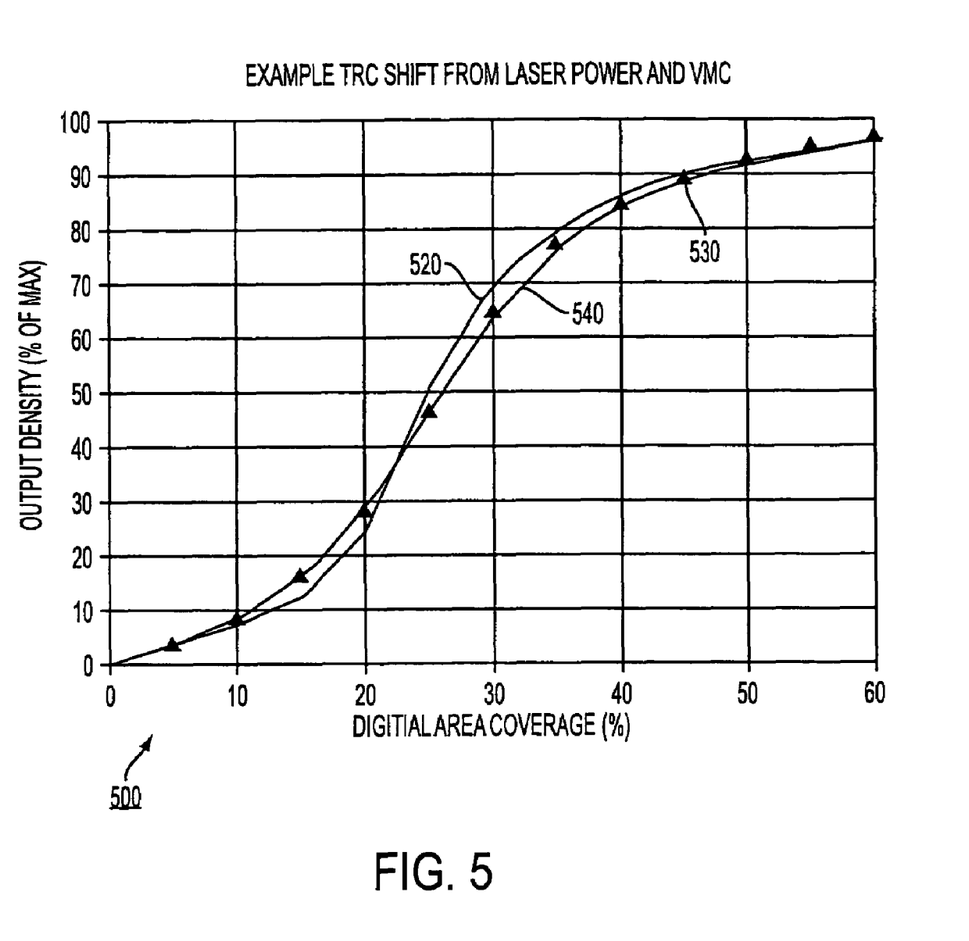
FIG. 5 is a graph showing the exemplary single actuator laser power adjusted curves of FIGS. 3 and 4 and the exemplary target tone reproduction curve of FIG. 4, with an additional exemplary embodiment of a tone reproduction curve using two actuators according to this invention.

FIG. 5 is a graph 500 plotting an exemplary laser power adjusted tone reproduction curve 520, an exemplary target tone reproduction curve 530 consisting of a series of triangles and a second exemplary corrected tone reproduction curve 540. The second exemplary corrected tone reproduction curve 540 represents an exemplary embodiment of a tone reproduction curve corrected by not only a single actuator adjusting laser power but also a second actuator employed to twist the resulting corrected curve (curve 520 in FIG. 5). The exemplary laser power adjusted tone reproduction curve 520 corresponds to curves 320 and 420. The exemplary target tone reproduction curve 530 corresponds to curve 430.

In various exemplary embodiments, the addition of a second actuator improves the correction latitude. In various exemplary embodiments, the second actuator is a segmented LED bar. In various exemplary embodiments, the second actuator is located post-charging and pre-imaging in the apparatus process. In various exemplary embodiments the second actuator generates a charge profile (Vc). In various exemplary embodiments the charge profile operates in conjunction with the ROS intensity profile. In various exemplary embodiments this leads to an improved optimization of the adjusted tone reproduction curve.

As is apparent in graph 500, the exemplary adjusted curve 540 employing two actuators achieves a far greater proximity with exemplary target tone reproduction curve 530 than does exemplary adjusted tone reproduction curve 520 using a single actuator to adjust laser power. Exemplary curve 540 is higher than exemplary curve 520 in the highlight region and lower than exemplary curve 520 in the midtone region. This is also true of the target tone reproduction curve 530. Thus, the adjustment of the tone reproduction curve achieved by the second actuator can be described as a twisting of the adjusted tone reproduction curve achieved by the first actuator.

An exemplary embodiment of a method of employing a second actuator will now be described. In various exemplary embodiments, an algorithm is employed that measures three tone reproduction curve levels, in various exemplary embodiments the three measured levels correspond to 20%, 50% and 75%. In various exemplary embodiments an algorithm is employed that calculates the sum of the three measured tone reproduction curve profiles (step S610 in FIG. 6). Thus, these exemplary embodiments obtain an average profile weighted by a factor of 3.

In various exemplary embodiments, a difference profile ΔD is calculated for the average profile. In various exemplary embodiments the difference profile is calculated by subtracting reference patch density from all other patch values (step S620 in FIG. 6). In various exemplary embodiments, patch values correspond to discrete steps in the profile such as the exemplary profiles depicted in FIGS. 1 and 2. In various exemplary embodiments the patch values are obtained from patches that are uniformly spaced across a page, thus corresponding to position on the page. In various exemplary embodiments, the reference patch density is arbitrarily selected. In various exemplary embodiments, the reference patch density corresponds to a predetermined color intensity, such as the reference points referred to above at arbitrary unit 15 in FIGS. 1 and 2. In various exemplary embodiments a difference profile corresponds to a curve that is generated where a reference point like one of the exemplary reference points in FIGS. 1 and 2 is subtracted from every point in the profile.

Figure 6:
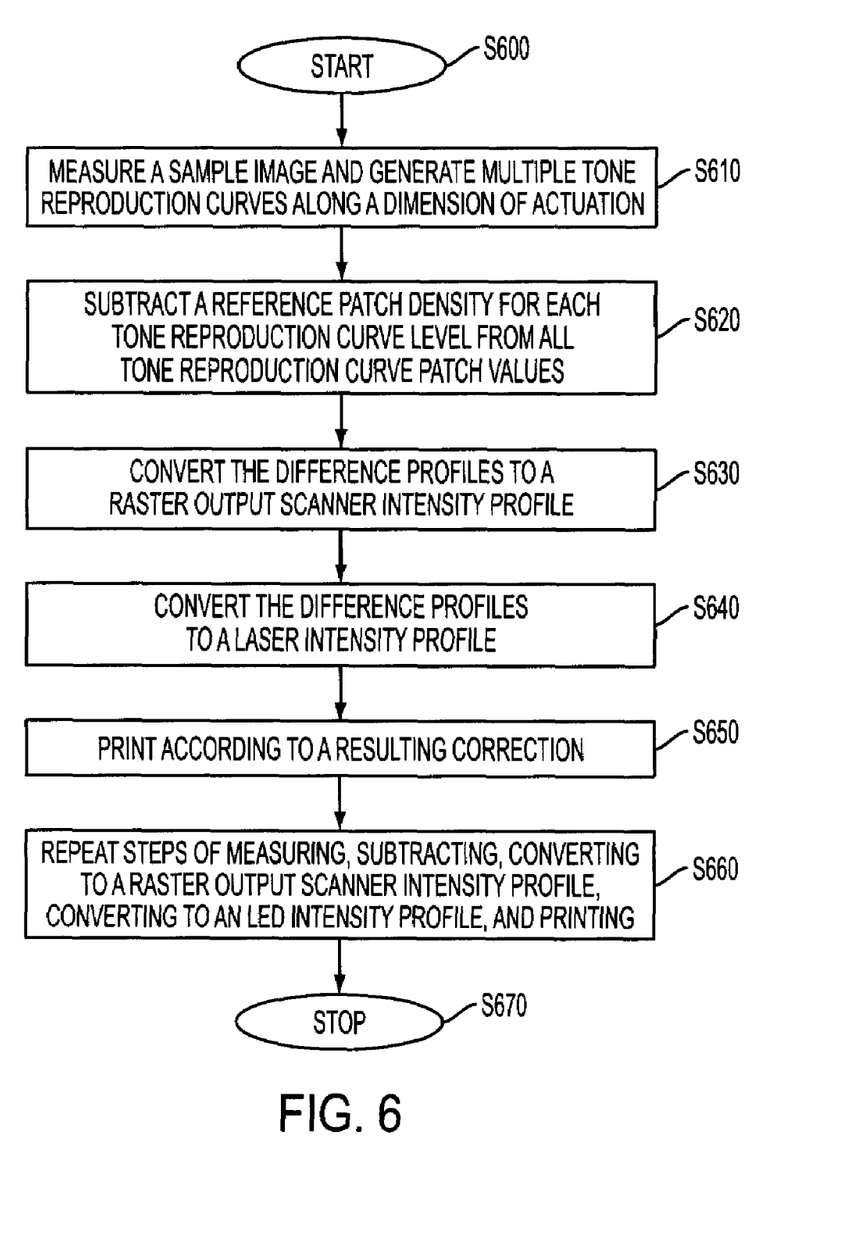
FIG. 6 is a flow diagram showing a method of correcting a uniformity profile in an electrostatographic printing apparatus.

In various exemplary embodiments, the difference profile is multiplied by a single sensitivity to laser power to convert from print density to ROS intensity profile units (step S630 in FIG. 6). This is referred to as a ΔRCC profile. Single sensitivity to laser power is a calibration constant employed to convert from print to laser power. Although in reality a variance exists from patch to patch, the single sensitivity laser power is an average that is applied for all patches. The ROS intensity profile units correspond to the laser beam output intensity but are actually units for the circuit that is being manipulated to generate the laser power. The laser power is adjusted in intensity based on the scan position (step S640 in FIG. 6).

In various exemplary embodiments, the correction profiles for the tone reproduction curve are generated by any standard process controller such as a proportional integral differential (PID) controller. In various exemplary embodiments, a fractional gain is applied to each ΔRCC profile. Thus, in these exemplary embodiments, the entire correction is not made in a single step. Rather, a portion of the correction is made and then the process is repeated iteratively. In this iterative process, the correction profile resulting from a single step is printed and then remeasured (step S650 in FIG. 6). The new measurement is then used to create the next sequential differential correction. This process is repeated iteratively until the uniformity correction reaches a desired threshold (step S660 in FIG. 6).

In various exemplary embodiments, more than one tone reproduction curve level must converge below a predetermined threshold before the desired uniformity is achieved. In various exemplary embodiments, three tone reproduction levels must converge below the said threshold before the desired uniformity is achieved. In various exemplary embodiments, tone reproduction curves at 20%, 50% and 70% must all converge below 4ΔE peak to peak before the desired uniformity for the differential correction is achieved.

In various exemplary embodiments, a spatial profile for a tone reproduction curve level is measured. In various exemplary embodiments, this method of measurement is employed for multiple tone reproduction curve levels. Thus, in these exemplary embodiments, the difference profile ΔD is calculated for each tone reproduction curve level by subtracting the reference patch density from all other patch values for that tone reproduction curve level. Thus, in these exemplary embodiments, the least squares fit to be solved is:

$$\Delta D_{20\%} = S_{LP@20\%} * \Delta LP_i + S_{Vmc@20\%} * \Delta Vc_i$$

$$\Delta D_{50\%} = S_{LP@50\%} * \Delta LP_i + S_{Vmc@50\%} * \Delta Vc_i$$

$$\Delta D_{70\%} = S_{LP@70\%} * \Delta LP_i + S_{Vmc@70\%} * \Delta Vc_i$$

where i=1 to N patches along the scan line, $S_{LP@NN\%}$ is the sensitivity of TRC level NN % to a change in laser power, and $S_{Vmc@NN\%}$ is the sensitivity of TRC level NN % to a change in Vc (Vmc). This can be generalized to N levels ($\Delta D_{NN\%}$) over the entire TRC and $S_{LP}$ and $S_{Vmc}$ can be functions of i.

It is believed that a satisfactory correction of the tone reproduction curve can be achieved using the various exemplary embodiments described above with as few as three tone reproduction curve levels and a constant $S_{LP}$. It is believed that it is desirable to employ as few tone reproduction curve levels in the process as possible while maintaining the desired level of correction in the tone reproduction curve profile. For example, when the data is scanned in using a spectrophotometer, an additional scan must be made for each tone reproduction curve level measured. Thus, each additional scan requires additional time and additional resources.

In various exemplary embodiments, a determination is made experimentally by first employing the process using only one tone reproduction curve level and then increasing the number of tone reproduction curve levels used until the process succeeds in achieving a satisfactory level of correction of the tone reproduction curve profile. In these exemplary embodiments, the minimum necessary number of tone reproduction curve levels is determined in the described manner.

It is also believed to be desirable to use the same controller when iteratively applying the exemplary embodiments described above to converge the uniformity curve. It is believed that by using the same controller, errors are reduced. Examples of such errors include print noise and changes in $S_{LP}$ and $S_{Vmc}$.

The current upper limit on the correction algorithm is approximately 10ΔE (CIELAB). This is solely driven by the over compensation problem described above. In various exemplary embodiments, the range of laser power used is between half and three-quarters of the range available in the ROS profile. In various exemplary embodiments, on a single TRC level, the full range of the ROS uniformity profile equates to as much as 20ΔE.

In various exemplary embodiments, the correction strategy uses an offline strip reading spectrophotometer to sense the uniformity. Thus, in various exemplary embodiments, initial actions are taken to remove print engine transients to uniformity. Causes of print engine transients include contaminated charge device grids, developer wire uniformity fall off, non uniformity that results from an aged developer material package, differential gloss from fusing, and transfer uniformity.

In various exemplary embodiments, the uniformity changes over time as more pages are printed. These changes in uniformity are referred to as the print engine transients. In various exemplary embodiments, these transients are made more uniform in the ways described above. In various exemplary embodiments, the device grids are cleaned to eradicate contamination. In various exemplary embodiments, new developer wires are installed when developer material becomes aged, and the developer material package is replaced. In various exemplary embodiments, the release agent system is serviced so that it better oils the roller. In various exemplary embodiments, the heat roll is replaced. All of these actions servicing the machine assist in making the print engine transients more uniform over time.

Even after removing all of the transient sources, in various exemplary embodiments a 10ΔE limit is insufficient to reduce the uniformity below 4ΔE across the TRC. In various exemplary embodiments, the ROS is the source of excessive uniformity problems. Thus, in various exemplary embodiments, the ROS is replaced instead of corrected. By increasing the correction latitude, the algorithm is able to resolve the remaining problems that occur above 10ΔE. This results in fewer expensive hardware replacements in certain exemplary embodiments.

In other words, it is not believed that the hardware limits the effective implementation of the exemplary embodiments described above. Rather, the addition of a second actuator frees up more of the range of the laser power available in the raster output scanner circuit. Thus, the exemplary embodiments described above enable more of the raster output scanner range to be usable for other purposes.

It will be appreciated that various of the above-disclosed and other features and functions, or alternatives thereof, may be desirably combined into many other different systems of applications. Also, various presently unforeseen or unanticipated alternatives, modifications, variations or improvements therein may be subsequently made by those skilled in the art which are also intended to be encompassed by the following claims.

What is claimed is:

1. A method of correcting a uniformity profile in an electrostatographic printing apparatus, comprising:

measuring a sample image and generating multiple tone reproduction curves along a dimension of actuation, each tone reproduction curve having a plurality of patch values, each patch value having a corresponding tone reproduction curve level;

subtracting a reference patch density for each tone reproduction curve level from all tone reproduction curve patch values at the corresponding tone reproduction curve level to obtain a difference profile for each tone reproduction curve level;

converting the difference profiles to a raster output scanner intensity profile;

converting the difference profiles to a laser intensity profile;

printing on the printing apparatus, according to a resulting correction; and repeating the steps of measuring, subtracting, converting to a raster output scanner intensity profile, converting to a laser intensity profile, and printing on the printing apparatus wherein the difference profiles are presented as a linear equation $$\Delta D_{NN\%,i} = S_{LP@NN\%,i} * \Delta LP_i + S_{LED@NN\%,i} * \Delta LED_i$$

where
- index NN % represents the tone reproduction curve level measured,
- index i is an index of the sample image measured along the dimension of actuation,
- $\Delta LP_i$ is a change in the raster output scanner intensity at index i relative to an intensity at a reference tone reproduction curve,
- $\Delta LED_i$ is a change in the laser intensity at index i relative to the intensity at the reference tone reproduction curve,
- $S_{LP@NN\%,i}$ is a change in a measured density per unit change in $\Delta LP_i$ for index i of tone reproduction curve level NN %, and
- $S_{LED@NN\%,i}$ is a change in a measured density per unit change in $\Delta LED_i$ for index i of tone reproduction curve level NN %, and
- the steps of converting the difference profiles are performed by simultaneously solving the following equations for $\Delta LED_i$ and $\Delta LP_i$ for each patch i from 1 to last $$\Delta D_{1,i} = S_{LP@1,i} * \Delta LP_i + S_{LED@1,i} * \Delta LED_i$$

$$\Delta D_{2,i} = S_{LP@2,i} * \Delta LP_i + S_{LED@2,i} * \Delta LED_i$$

$$\Delta D_{last,i} = S_{LP@last,i} * \Delta LP_i + S_{LED@last,i} * \Delta LED_i.$$

2. The method according to claim 1, wherein the steps of measuring, subtracting, converting to a raster output scanner intensity profile, and converting to a laser intensity profile, are performed for only a subset of all tone reproduction curve levels.

3. The method according to claim 1, wherein $S_{LP@NN\%,i}$ is constant for all values of index i.

4. The method according to claim 1, wherein $S_{LED@NN\%,i}$ is constant for all values of index i.

5. The method according to claim 1, wherein the steps of measuring, subtracting, converting to a raster output scanner intensity profile and converting to a laser intensity profile are repeated until the uniformity correction reaches a desired threshold.

6. The method according to claim 1, wherein $S_{LP@NN\%,i}$ is constant for all values of index i and for all values of index NN %.

7. The method according to claim 1, wherein $S_{LED@NN\%,i}$ is constant for all values of index i and for all values of index NN %.

8. The method according to claim 1, further comprising modulating the laser intensity profile to produce a charge profile.

9. The method according to claim 8, wherein the charge profile operates in conjunction with the raster output scanner intensity profile.

10. The method according to claim 1, wherein a reference tone reproduction curve corresponds to a predetermined color target.

11. The method according to claim 1, wherein the steps of measuring, subtracting, converting to a raster output scanner intensity profile and converting to a laser intensity profile are performed continuously as part of a closed process control loop.

* * * * *